United States Patent
Milkov (10) Patent No.: US 12,474,450 B2
(45) Date of Patent: Nov. 18, 2025

(54) LIDAR SENSOR WITH HIGH DYNAMIC RANGE PULSE RECEIVER

(71) Applicant: Continental Automotive Systems, Inc., Auburn Hills, MI (US)

(72) Inventor: Mihail Milkov, Moorpark, CA (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 1024 days.

(21) Appl. No.: 17/446,439

(22) Filed: Aug. 30, 2021

(65) Prior Publication Data

US 2023/0061926 A1   Mar. 2, 2023

(51) Int. Cl.
| | |
|---|---|
| G01S 7/48 | (2006.01) |
| G01S 7/484 | (2006.01) |
| G01S 7/4863 | (2020.01) |
| G01S 17/931 | (2020.01) |

(52) U.S. Cl.
CPC ............ G01S 7/4863 (2013.01); G01S 7/484 (2013.01); G01S 17/931 (2020.01)

(58) Field of Classification Search
CPC ...... G01S 7/484; G01S 7/4861; G01S 7/4863; G01S 17/931
See application file for complete search history.

(56) References Cited

U.S. PATENT DOCUMENTS

| | | | |
|---|---|---|---|
| 11,592,558 B2 * | 2/2023 | El Amili | ............... G01S 7/4865 |
| 2005/0258339 A1 | 11/2005 | Chen | |
| 2013/0069727 A1 | 3/2013 | Lin | |
| 2021/0132229 A1 | 5/2021 | Milkov et al. | |

OTHER PUBLICATIONS

International Search Report and Written Opinion dated Feb. 20, 2024 from corresponding International patent application No. PCT/US2022/075620.

* cited by examiner

Primary Examiner — Kevin K Pyo (57) ABSTRACT

A lidar sensor includes an optical transmitter configured to generate a pulse of light. The lidar sensor also includes an optical receiver configured to receive the pulse of light generated by the optical transmitter and reflected off an object in a field of view. The optical receiver includes a photodetector configured to generate a photocurrent pulse corresponding to the received pulse of light. A receiver circuit is electrically connected to the photodetector. The receiver circuit includes a current mirror providing multiplication of the photocurrent pulse provided by the photodetector. The receiver circuit is also configured to convert the photocurrent pulse to a voltage pulse and provide the voltage pulse as an output.

14 Claims, 7 Drawing Sheets

LIDAR SENSOR WITH HIGH DYNAMIC RANGE PULSE RECEIVER

TECHNICAL FIELD

The technical field relates generally to lidar sensors and more specifically to pulse receiver circuitry for a lidar sensor.

BACKGROUND

Lidar sensors often include an optical transmitter to generate a pulse of light. The pulse of light reflects off an object or objects that may be present in a field of illumination. An optical receiver then receives the reflected pulse of light. The optical receiver may include one or more photodetectors. The time it takes for the light to travel from the optical transmitter to the object and back to the optical receiver provides a way to determine the distance to the object. A position of the object can also be determined.

A receiver circuit may be electrically coupled to each photodetector to generate a voltage pulse generally corresponding to the signal generated by the photodetector in response to receiving the reflected pulse of light. Receiver circuits of the prior art have numerous drawbacks. For instance, when a simple transimpedance amplifier with a linear feedback resistor is utilized in the receiver circuit, the circuit provides limited dynamic range. Furthermore, the shape of the voltage pulse may be inconsistent, or it may exhibit spikes, undershoot or ringing, as the photocurrent pulse amplitude increases.

As such, it is desirable to present a receiver circuit that can provide a high dynamic range, a consistent pulse shape and sufficiently large transimpedance. Other desirable features and characteristics will become apparent from the subsequent summary and detailed description, and the appended claims, taken in conjunction with the accompanying drawings and this background.

BRIEF SUMMARY

In one exemplary embodiment, a lidar sensor includes an optical transmitter configured to generate a pulse of light. The lidar sensor also includes an optical receiver configured to receive the pulse of light generated by the optical transmitter and reflected off an object in a field of view. The optical receiver includes a photodetector configured to generate a photocurrent pulse corresponding to the received pulse of light. A receiver circuit is electrically connected to the photodetector. The receiver circuit includes a current mirror providing multiplication of the photocurrent pulse generated by the photodetector. The receiver circuit is also configured to convert the photocurrent pulse to a voltage pulse and provide the voltage pulse as an output. In order to achieve high input dynamic range, the current-to-voltage conversion is linear for small photocurrent pulses and nonlinear for large ones.

In one exemplary embodiment, a method of operating a lidar sensor includes generating a pulse of light with an optical transmitter. The method also includes receiving the pulse of light generated by the optical transmitter and reflected off an object in a field of view with an optical receiver. The method further includes generating a photocurrent pulse corresponding to the received pulse of light with a photodetector of the optical receiver. The photocurrent pulse provided by the photodetector is multiplied with a current mirror and is then converted to a voltage pulse and provided as an output.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, a lidar sensor 100 is shown and described herein.

Figure 1:
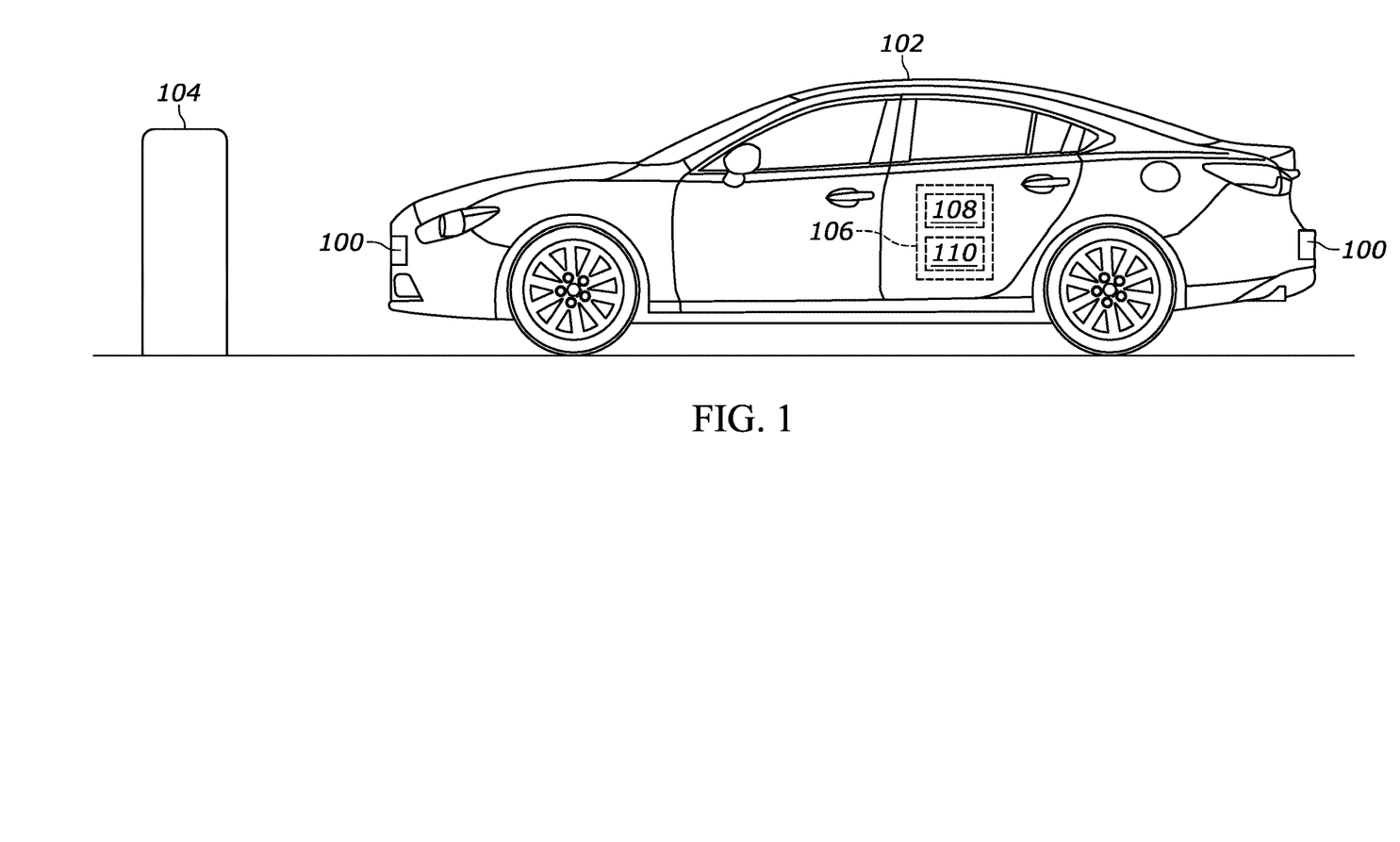
FIG. 1 is a side view of a vehicle equipped with a lidar sensor according to one exemplary embodiment.

FIG. 1 is a side view of an example vehicle 102 and an object 104. The vehicle 102 shown in FIG. 1 is a passenger automobile comprising at least one computer 106 and the lidar sensor 100. However, as other examples, the vehicle 102 may be of any suitable manned or unmanned vehicle including a truck, motorcycle, plane, satellite, drone, watercraft, robot, etc. The object 104 may be a moving or stationary object such as another vehicle, pedestrian, vegetation, building, etc., located outside the vehicle 102.

The computer 106 may include any suitable computing device programmed to operate the lidar sensor 100 and/or other vehicle components. In at least one example, computer 106 includes a processor 108 and memory 110. The processor 108 and the memory 110 are digital. Non-limiting examples of processor 108 include a microprocessor, a microcontroller or controller, an application specific integrated circuit (ASIC), a field-programmable gate array (FPGA), and/or one or more electrical circuits comprising discrete digital and/or analog electronic components arranged to perform predetermined tasks or instructions, etc.

Memory 110 may include any non-transitory computer usable or readable medium, which may include one or more storage devices or articles. Exemplary non-transitory computer usable storage devices include conventional hard disk, solid-state memory, random-access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer readable media exist and include magnetic media, compact disc ROM (CD ROMs), digital video discs (DVDs), other optical media, any suitable memory chip or cartridge, or any other medium from which a computer can read. In general, memory 110 may store one or more computer program products which may be embodied as software, firmware, or other programming instructions executable by the processor 108.

Computer 106 may include other hardware elements (not shown) such as an analog-to-digital converter (ADC), digital-to-analog converter (DAC), and one or more discrete circuits for controlling or otherwise enabling various switches or the like in electronic circuits of lidar sensor 100. In one example, the lidar sensor 100 may include the computer 106, e.g., the computer 106 may be physically located within a housing of lidar sensor 100. In another example, the computer 106 may be a component distinct from the lidar sensor 100 and located at any suitable location in the vehicle 102.

While not portrayed in the illustrations, lidar sensor 100 and computer 106 may be communicatively coupled via any suitable wired and/or wireless communication network—e.g., permitting computer 106 to send and/or receive instructions and/or data between it, vehicle 102 components, and/or lidar sensor 100.

Figure 2:
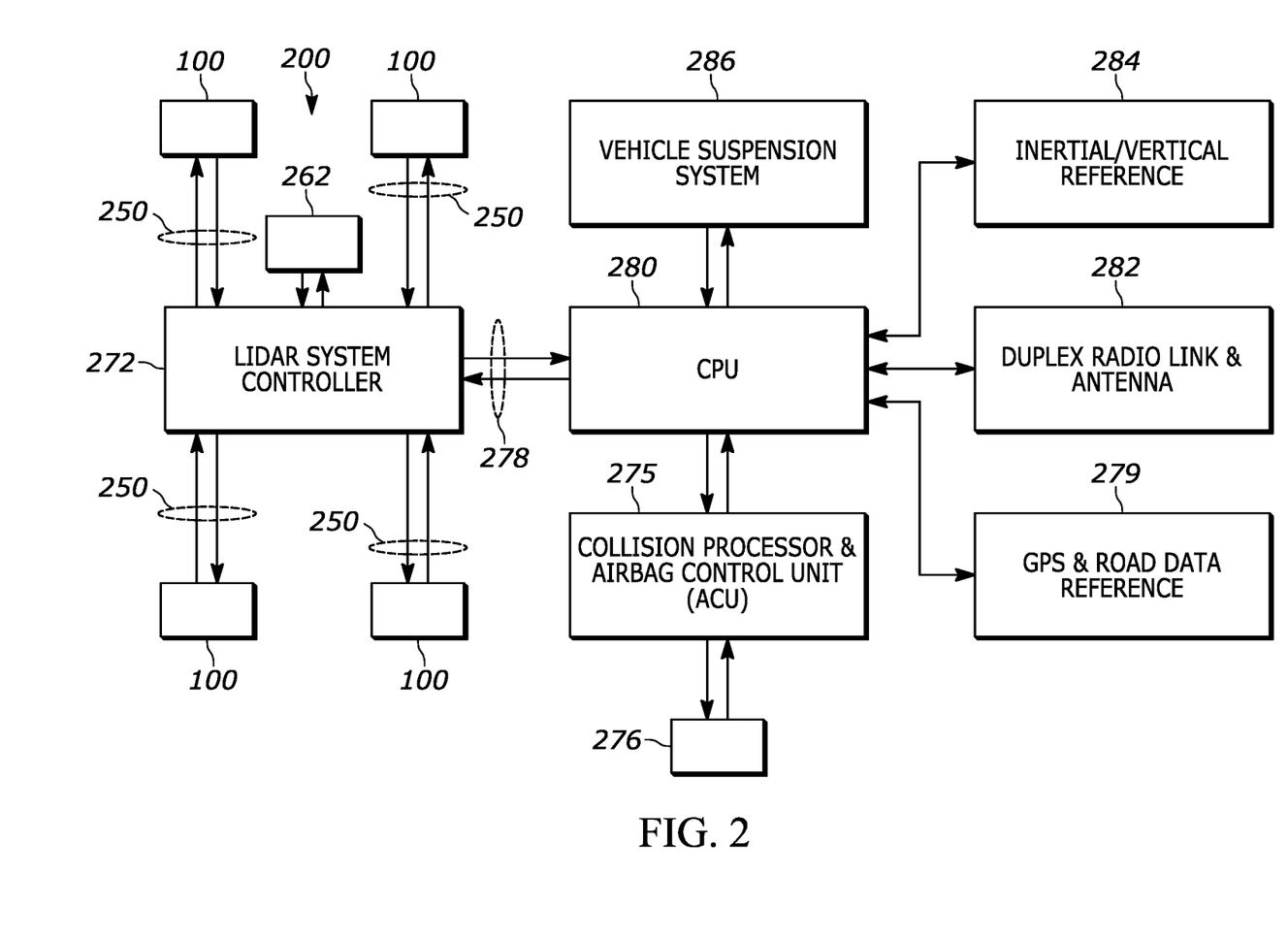
FIG. 2 is a block diagram of a lidar sensor system of a vehicle according to one exemplary embodiment.

FIG. 2 is a system block diagram showing a lidar sensor system 200 with connections to various systems of the vehicle 102, according to one exemplary embodiment. A lidar system controller 272 communicates with multiple lidar sensors 100 mounted on the vehicle 102. In this example installation, four lidar sensors 100 connect to the lidar system controller 272 through a set of bidirectional electrical connections 250. The electrical connections 250 may also include an optical waveguide (not shown) and optical transmitters and receivers (not shown) to transfer data, control, and status signals bidirectionally between lidar sensors 100 and the lidar system controller 272. Each of the lidar sensors 100 may include data processors (not shown in FIG. 2) to reduce the processing load; for example, developing a point cloud and isolating/segmenting objects and object speed from the point cloud. Visible light or infrared cameras 262 may be embedded within the lidar sensor system 200 and may be part of a sub-assembly containing a lidar sensor 100. These cameras 262 may share the same connections 250 to the lidar system controller 272.

FIG. 2 also illustrates a central processing unit (CPU) 280. Bidirectional electrical connections 278 may serve to transfer 3D data maps, status, and control signals between the lidar system controller 272 and the vehicle electrical systems and CPU 280. At the core of the vehicle 102, the CPU 280 may control all functioning of the vehicle 102, and typically controls all other subsystems and co-processors. Additionally, or alternatively, CPU 280 may be the computer 106 of the vehicle 102 as shown in FIG. 1.

In one embodiment, a vehicle suspension system 286 receives control commands from the CPU 280 and returns status through bidirectional electrical connections, and is capable of modifying the ride height, spring rate, and damping rate of each of the vehicle's wheels independently. An inertial reference 284 also has a vertical reference or gravity sensor as an input to the CPU 280. A global positioning system (GPS) reference 279 may also be connected to the vehicle CPU 280. The GPS reference 279 may also have a database of all available roads and conditions in the area which may be updated periodically through a wireless link. A duplex radio link 282 may also be connected to CPU 280 and may communicate directly with other vehicles in close range, sharing position, speed, direction, and vehicle-specific information to facilitate collision avoidance and the free flow of traffic. The duplex radio link 282 may also receive local positional references, road data, weather conditions, and other information important to the operations of the vehicle 102 from a central road conditions database through roadside antennas or cellular stations. The vehicle 102 may also provide vehicle status and road conditions updates to the central road conditions database via the duplex radio link 282, allowing the central road conditions database to be augmented by any and all vehicles that are equipped with lidars sensors 100 and the duplex radio link 282. A collision processor and airbag control unit (ACU) 275 connects bidirectionally to CPU 280 as well, receiving inputs from a number of accelerometers, brake sensors, wheel rotational sensors, lidar sensors, etc. The ACU 275 makes decisions on the timing and deployment of airbags and other restraints.

One or more visible light or infrared cameras 276 may connect directly to the vehicle collision processor and ACU 275 and produce scene data complementary to the three-dimensional data generated by the various lidar sensors 100 mounted to the vehicle 102. The fields of view of cameras 262 and 276 may be designed to overlap the fields of view of the lidar sensors 100 installed on the vehicle 102.

Though the system 200 of FIG. 2 is shown with the vehicle 102 on which the system 200 is nominally installed, and which is typically an automobile, the system 200, and any of the described components and subsystems are designed to be installed on any number of moving vehicles which may be actively piloted, semi-autonomously navigated, or fully autonomously steered and controlled, and which may be manned or unmanned, including trains, trams, buses, automobiles, motorcycles, trucks, utility vehicles, street sweepers, robotic crawlers, boats, ships, submersibles, amphibious vehicles, planes, helicopters, drones, hovercraft and spacecraft.

Figure 3:
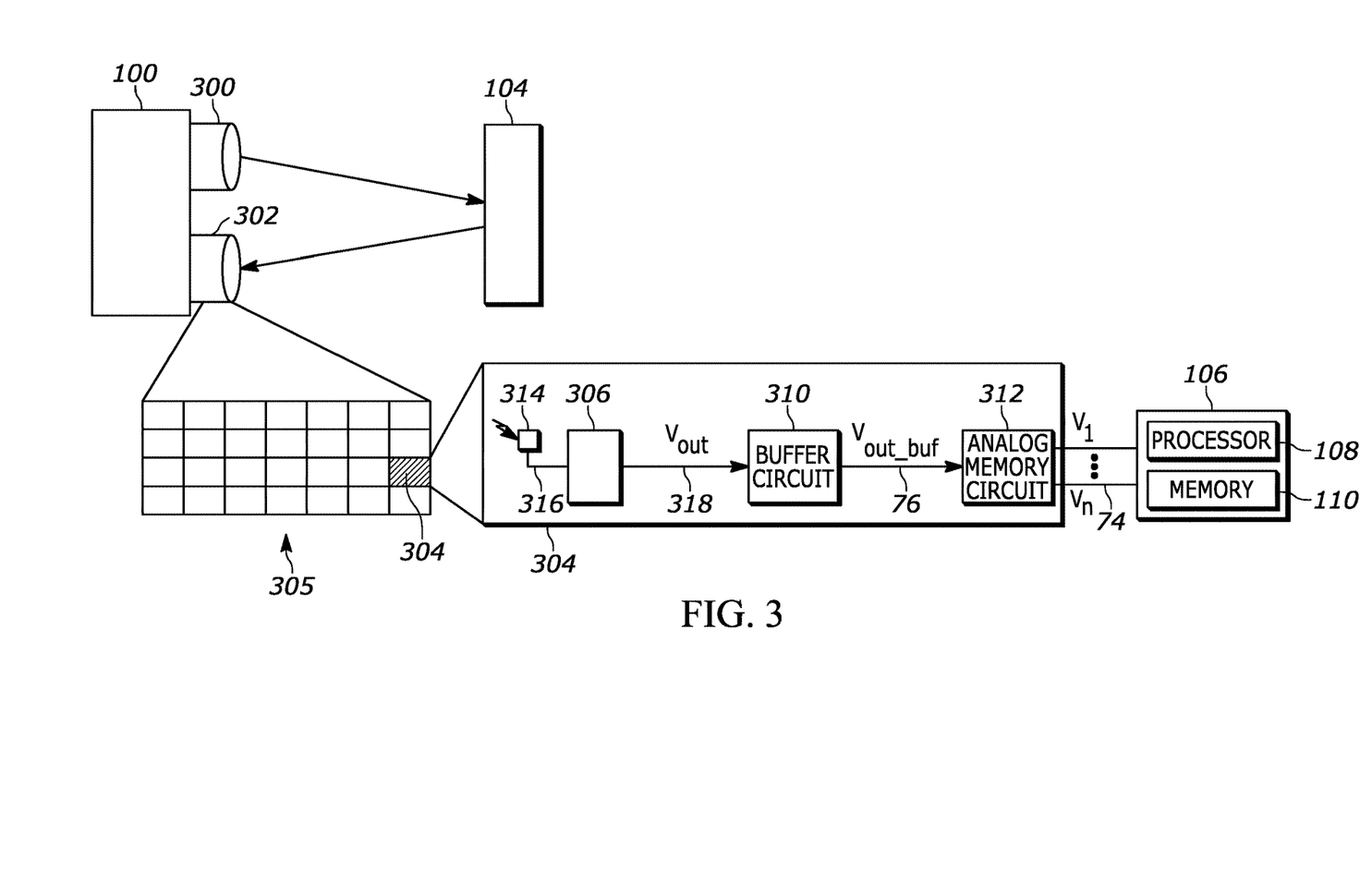
FIG. 3 is a block diagram of the lidar sensor according to one exemplary embodiment.

FIG. 3 is a block diagram of the lidar sensor 100 according to one exemplary embodiment. The lidar sensor 100 includes an optical transmitter 300 configured to generate a pulse of light. The optical transmitter 300 may be implemented with at least one of a solid-state laser, monoblock laser, semiconductor laser, fiber laser, or an array of semiconductor lasers. In one embodiment, the optical transmitter 300 is an array of vertical cavity surface emitting lasers (VCSELs). In another embodiment, the optical transmitter 300 is a disc-shaped solid-state laser of erbium-doped phosphate glass pumped by a 976-nm semiconductor laser.

The optical transmitter 300 may also include transmit optics (not separately shown) to condition the laser output beam into a proper conical, elliptical, or rectangular shaped beam for illuminating a central section of a scene or objects 104 in the path of vehicle 102. The transmit optics may include, but is not limited to, a spherical lens, cylindrical lens, holographic diffuser, diffractive grating array, or micro-lens array. The transmit optics may diffuse the high-intensity laser beam spot substantially uniformly over a desired field of view. Alternatively, the optical transmitter 300 may include a scanning mechanism for sweeping the laser beam over the desired field of view. For example, this scanning mechanism may comprise a microelectromechanical (MEMS) mirror. In one embodiment, a transmit filter (not shown) acts to constrain the laser light output to the design wavelength, removing any spurious emissions outside the design wavelength.

The lidar sensor 100 includes an optical receiver 302 configured to receive the pulse of light generated by the optical transmitter 300 and reflected off the object 104 in the field of view. When some portion of the transmitted laser pulse is reflected from the object 104, it may be incident upon receive optics. The receive optics (not separately shown) is part of the optical receiver 302 and is typically implemented with a lens assembly (not separately shown) and/or an array of microlenses (not separately shown). Further embodiments of receive optics may employ diffractive arrays to collect and channel the incoming light.

The optical receiver 302 may include any suitable electronic device for detecting light transmitted by the optical transmitter 300 and reflected from the object 104. With reference to FIG. 3, according to one example, the optical receiver 302 includes one or more pixels 304. In the illustrated example, the optical receiver 302 includes an array 305 of pixels 304. In at least one example, each pixel 304 may be identical; therefore, only one will be described. Each pixel 304 may include a receiver circuit 306, a voltage buffer circuit 310, and an analog memory circuit 312.

Each pixel 304 includes a photodetector 314. The photodetector 314 is configured to generate a photocurrent pulse corresponding to the received pulse of light. In one example, the photodetector 314 is a PIN photodiode, but may be an avalanche photodiode (APD) or other type of photodiode. The optical receiver 302 may have an attached optical bandpass filter (not shown) for selecting the wavelength of light corresponding to the wavelength of the laser light generated by the optical transmitter 300.

The input 316 of receiver circuit 306 is electrically connected to the photodetector 314 and receives the photocurrent pulse produced by the photodetector 314. The receiver circuit 306 is configured to convert the photocurrent pulse to a voltage pulse $V_{out}$ at its output 318.

Figure 4:
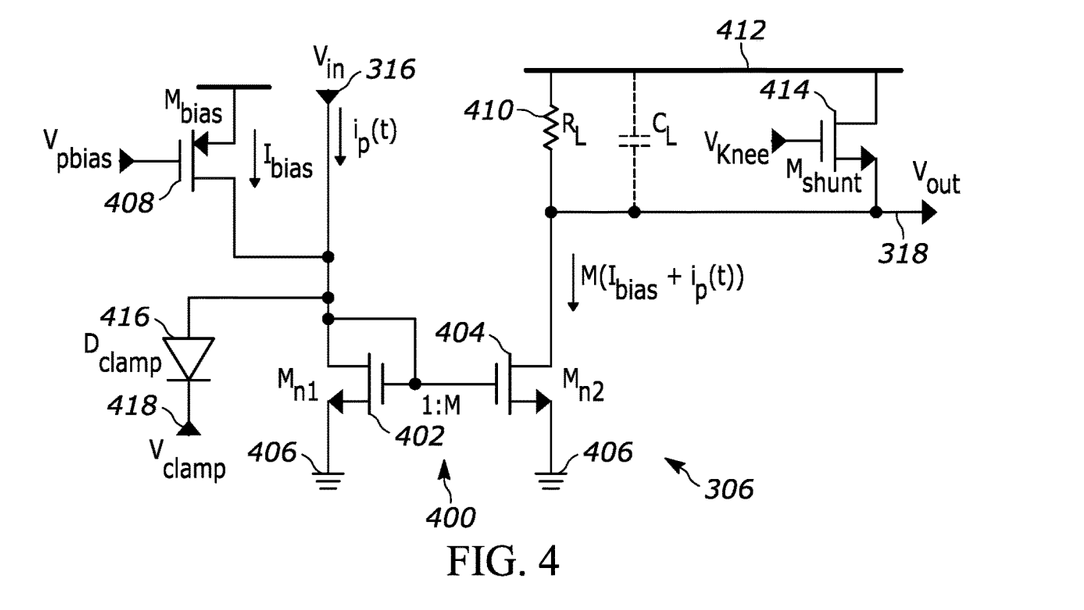
FIG. 4 is an electrical schematic diagram of a receiver circuit according to a first exemplary embodiment.
Figure 6:
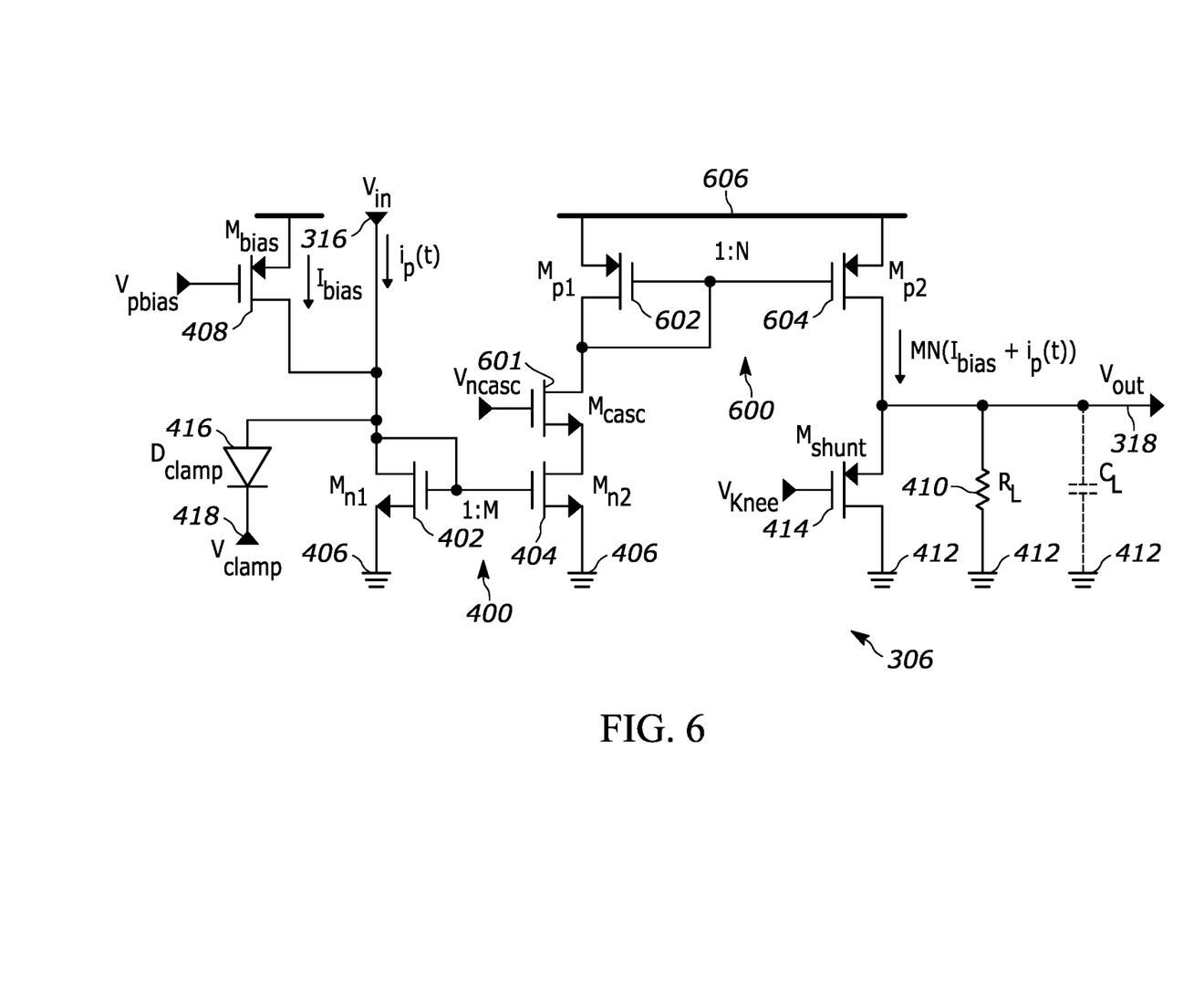
FIG. 6 is an electrical schematic diagram of a receiver circuit according to a second exemplary embodiment.

Referring now to FIGS. 4 and 6, the receiver circuit 306 includes a current mirror 400 to provide multiplication of the photocurrent pulse $i_p(t)$ provided at the input 316 of receiver circuit 306. The photocurrent multiplication results in higher transimpedance, i.e., a larger amplitude of the voltage pulse $V_{out}$ generated at the receiver circuit output 318 for the same amplitude of the photocurrent pulse $i_p(t)$.

The receiver circuit 306 has the following advantages compared to the prior art. It achieves high input dynamic range by compressing the voltage pulse $V_{out}$ at its output 318 for large photocurrent pulses. More specifically, as the photocurrent pulse amplitude increases, the receiver circuit 306 goes through the following regions of current-to-voltage conversion: linear, square root and logarithmic. In the linear region, photocurrent multiplication by the current mirror 400 and linear current-to-voltage conversion result in high transimpedance. Consequently, temporal and fixed-pattern noise sources in the analog signal chain downstream of the receiver circuit 306 have little effect on the overall noise and it is therefore possible to achieve low overall input-referred noise. Furthermore, as the receiver circuit 306 does not employ an amplifier in negative feedback as part of the voltage-to-current conversion, the shape of the voltage pulse $V_{out}$ at the output 318 remains very stable over the full input dynamic range, i.e., it is inherently immune to spikes, undershoot and ringing. Lastly, by means of the diode-connected device 402 at the input 316, the receiver circuit 306 achieves low input impedance, which reduces the effect of the detector capacitance on the width and amplitude of the voltage pulse $V_{out}$. These advantages will become more apparent as the structure and operation of the receiver circuit 306 is described in detail in the following paragraphs.

In the exemplary embodiments shown in FIGS. 4 and 6, the current mirror 400 includes a first metal-oxide-semiconductor field-effect transistor ("MOSFET") 402 and a second MOSFET 404. Each of these MOSFETs 402, 404 is a n-channel MOSFET 402, 404, or simply a NMOS device 402, 404. However, it should be appreciated that if the photocurrent pulse $i_p(t)$ has opposite polarity, i.e., if it flows out of the receiver circuit input 316, then the current mirror 400 may be implemented with p-channel MOSFETs. Furthermore, the current mirror 400 may be implemented with other semiconductor devices, e.g. NPN or PNP bipolar junction transistors (BJTs), as appreciated by those of ordinary skill in the art.

In the exemplary embodiments shown in FIGS. 4 and 6, each MOSFET 402, 404 includes a gate (not numbered) electrically connected to the receiver circuit input 316. Furthermore, the first MOSFET 402 includes a drain (not numbered) electrically connected to the receiver circuit input 316. Also, each MOSFET 402, 404 includes a source (not numbered) electrically connected to a constant potential 406. In the exemplary embodiments, the constant potential 406 is a ground. Furthermore, the second MOSFET 404 of FIG. 4 includes a drain electrically connected to the receiver circuit output 318.

The MOSFETs 402, 404 form a current mirror with a mirror ratio 1:M, wherein $$M = \frac{W_{404}L_{402}}{W_{402}L_{404}},$$

and wherein W and L are the width and length of the respective MOSFET 402, 404. Thus, the output pulse current (flowing into the drain of the second MOSFET 404) is approximately equal to $M \times i_p(t)$, where $i_p(t)$ is the photocurrent pulse.

The receiver circuit 306 in FIGS. 4 and 6 also includes a current source 408 electrically connected to the drain of the first MOSFET 402. In these exemplary embodiments, the current source 408 is another MOSFET. The first MOSFET 402 is biased by the current source 408. As such, the first MOSFET 402 achieves low impedance towards the photodetector 314 so that the capacitance of the photodetector 314 and any additional capacitance at the receiver circuit input 316 do not significantly affect the shape of the of the voltage pulse $V_{out}$ at the output 318.

The receiver circuit 306 in FIGS. 4 and 6 also includes a PN junction 416, e.g., a diode $D_{clamp}$. The PN junction 416 includes a P-type terminal (not numbered) electrically connected to the receiver circuit input 316 and an N-type terminal (not numbered) electrically connected to a constant potential 418, e.g., a supply voltage $V_{amp}$. The PN junction 416 conducts a portion of the photocurrent pulse $i_p(t)$ when the photocurrent pulse exceeds a threshold. The PN junction 416 provides overvoltage protection of the receiver circuit input 316 as well as logarithmic compression of the voltage pulse $V_{out}$. More specifically, as the photocurrent pulse $i_p(t)$ flows through the diode-connected first MOSFET 402, the voltage $V_{in}(t)$ rises. When $V_{in}(t)$ exceeds $V_{amp}$, diode $D_{amp}$ becomes forward biased and conducts a portion of the photocurrent pulse $i_p(t)$. When most of the photocurrent pulse $i_p(t)$ flows through $D_{amp}$, then $V_{in}(t)$ is logarithmically dependent on $i_p(t)$. Since $V_{in}(t)$ is also the gate bias of the second MOSFET 404, the drain current of the second MOSFET 404, and hence also the amplitude of the voltage pulse $V_{out}(t)$, grow logarithmically with the amplitude of the photocurrent pulse i$_p$(t). This achieves logarithmic voltage compression of the voltage pulse V$_{out}$ at the receiver circuit output 318 for very large photocurrent pulses, thereby increasing the input dynamic range of the receiver circuit 306.

The receiver circuit 306 in FIGS. 4 and 6 also includes a resistor R$_L$ 410 electrically connected between the receiver circuit output 318 and a constant potential 412. The receiver circuit 306 may also include a capacitor C$_L$ (not numbered) electrically connected between the receiver circuit output 318 and a constant potential 412. In practice, capacitor C$_L$ may not be a physical capacitor but may represent the total capacitance (e.g., gate, junction and parasitic capacitance) at the receiver circuit output 318. For small photocurrent pulses, shunt MOSFET 414 is off and the parallel combination of R$_L$ and C$_L$ serve as the load impedance that linearly converts the current pulse to a voltage pulse V$_{out}$(t) at the receiver circuit output 318. The larger R$_L$ and the smaller C$_L$, the larger the amplitude of the voltage pulse V$_{out}$(t). At the same time, the product of R$_L$ and C$_L$ defines the decay time constant of the voltage pulse V$_{out}$(t). Consequently, it is advantageous to keep C$_L$ as small as possible while the choice of R$_L$ is a tradeoff between pulse amplitude and decay time constant.

The receiver circuit 306 may also include a shunt MOSFET 414. As shown in FIGS. 4 and 6, the shunt MOSFET 414 has a source (not numbered) electrically connected to the receiver circuit output 318, a gate (not numbered) electrically connected to a bias voltage V$_{knee}$, and a drain (not numbered) electrically connected to the constant potential 412. Alternatively, the shunt MOSFET 414 may have a gate and a drain both electrically connected to the receiver circuit output 318 and a source electrically connected to a constant potential. The shunt MOSFET 414 conducts a portion of the photocurrent pulse when the photocurrent pulse exceeds a threshold. More specifically, referring to FIG. 4, during the photocurrent pulse the voltage V$_{out}$(t) at the receiver circuit output 318 decreases as the current pulse flows through the load impedance defined by the parallel combination of R$_L$ and C$_L$. When V$_{out}$(t) drops a threshold below V$_{knee}$, shunt MOSFET 414 (which is a n-type MOSFET) turns on and conducts a portion of the current pulse. Similarly, referring to FIG. 6, during the photocurrent pulse the voltage V$_{out}$(t) at the receiver circuit output 318 increases as the current pulse flows through the load impedance defined by the parallel combination of R$_L$ and C$_L$. When V$_{out}$(t) exceeds V$_{knee}$ by a threshold, shunt MOSFET 414 (which is a p-type MOSFET) turns on and conducts a portion of the current pulse. Referring to either FIG. 4 or 6, when most of the current pulse flows through shunt MOSFET 414 instead of R$_L$ or C$_L$, then the amplitude of the voltage pulse V$_{out}$(t) grows approximately with the square root of the current pulse amplitude in accordance with the MOSFET I (V) characteristic in saturation. This achieves voltage compression of the voltage pulse V$_{out}$(t) at the receiver circuit output [316] 318 and thereby increases the input dynamic range of the receiver circuit 306.

Referring now to the embodiment of FIG. 6, the aforementioned current mirror 400 is referred to as a first current mirror 400. In this embodiment, the receiver circuit 306 also includes a second current mirror 600 electrically connected to the first current mirror 400.

The second current mirror includes a third MOSFET 602 and a fourth MOSFET 604, wherein the third and fourth MOSFETs 602, 604 each includes a gate (not numbered) electrically connected to a drain (not numbered) of the second MOSFET 404. The third and fourth MOSFETs each includes a source (not numbered) electrically connected to a constant potential 606. A drain (not numbered) of the third MOSFET 602 is electrically connected to the drain of the second MOSFET 404. The fourth MOSFET 604 includes a drain (not numbered) electrically connected to the receiver circuit output 318.

The MOSFETs 602, 604 form a current mirror with a mirror ratio 1:N, wherein $$N = \frac{W_{604}L_{602}}{W_{602}L_{604}},$$

and wherein W and L are the width and length of the respective MOSFET 602, 604. Thus, taking into account the first mirror ratio M and second mirror ratio N, the output current pulse (flowing out of the drain of the fourth MOSFET 604) is approximately equal to M×N×i$_p$(t), where i$_p$(t) is the photocurrent pulse. Therefore, one advantage of the receiver circuit 306 of FIG. 6 compared to that of FIG. 4 is the increased photocurrent multiplication (M×N instead of M) leading to higher transimpedance. A second advantage of the receiver circuit 306 of FIG. 6 compared to that of FIG. 4 is that the voltage pulse V$_{out}$ at the receiver circuit output 318 is referred to ground instead of the supply voltage.

Referring to FIG. 6, the receiver circuit 306 may also include a cascode MOSFET 601 electrically connected between the drain of the second MOSFET 404 and the drain of the third MOSFET 602. The role of cascode MOSFET 601 is to maintain the voltage at the drain of the second MOSFET 404 below a certain level, i.e., a gate-to-source voltage below the bias voltage V$_{ncasc}$. This allows for the first current mirror 400 to be implemented using thin-gate devices (for lower capacitance and/or impedance at the receiver circuit input 316) while the rest of the receiver circuit 306 may use thick-gate devices (for larger voltage swing).

Figure 5:
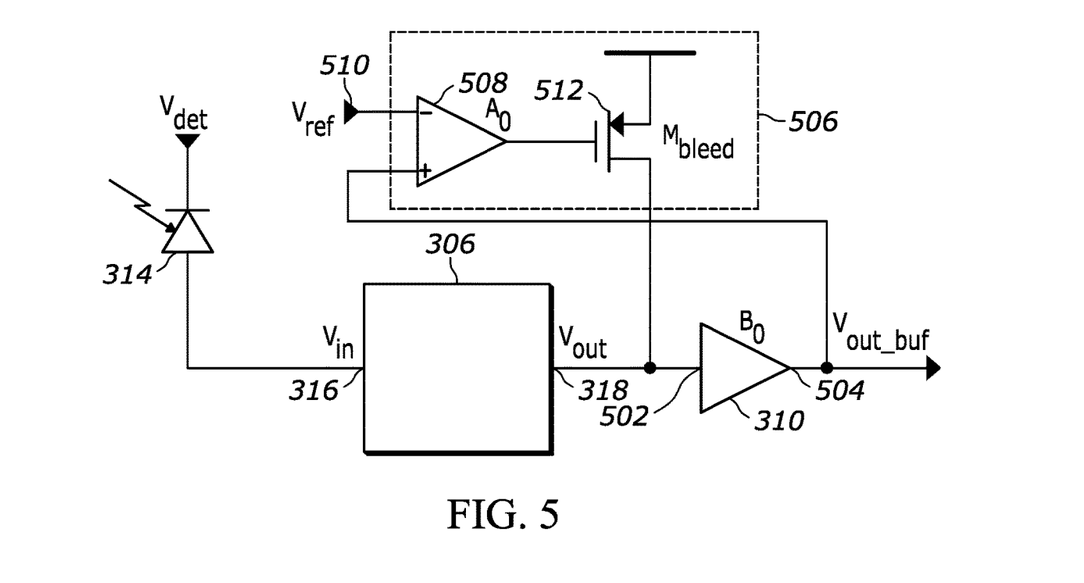
FIG. 5 is an electrical schematic diagram of a servo loop circuit coupled to the receiver circuit according to the first exemplary embodiment.
Figure 7:
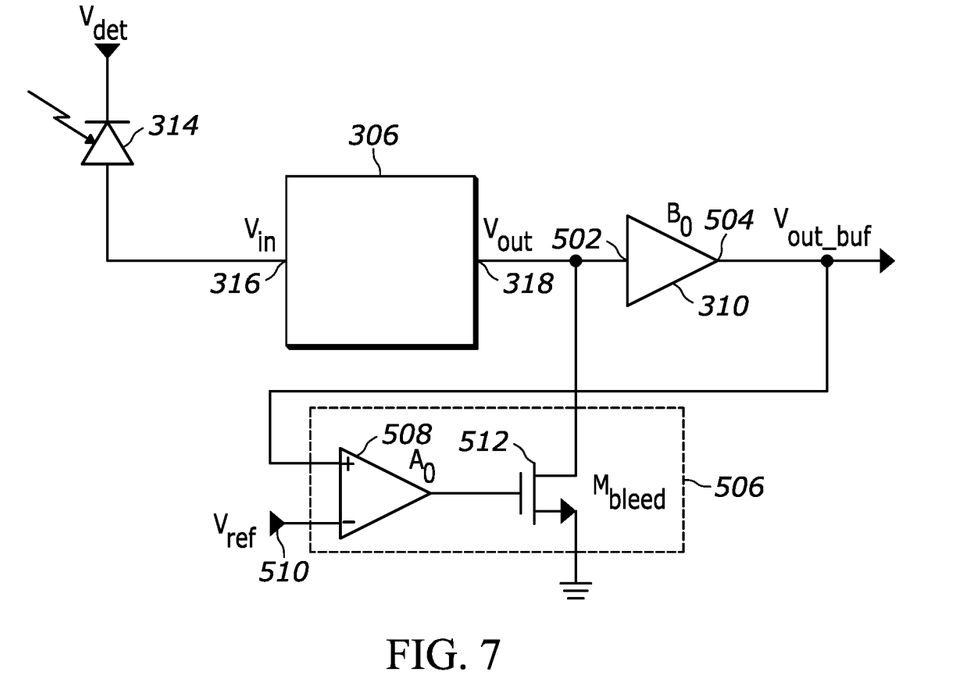
FIG. 7 is an electrical schematic diagram of a servo loop circuit coupled to the receiver circuit according to the second exemplary embodiment.

The voltage buffer circuit 310 is shown in further detail in FIGS. 5 and 7 and includes an input 502 and an output 504. The input 502 of the voltage buffer 310 is electrically connected to the output 318 of the receiver circuit 306. The output 504 of the voltage buffer 310 may be connected to the analog memory circuit 312 as shown in FIG. 3.

Referring to FIGS. 5 and 7, the optical receiver 302 may further include a servo loop circuit 506. The servo loop circuit 506 is electrically connected to the output 318 of the receiver circuit 306 and the output 504 of the voltage buffer 310. The servo loop circuit 506 includes an amplifier 508 having a first input (not numbered) electrically connected to the output 504 of the voltage buffer 310, a second input (not numbered) electrically connected to a reference voltage 510, and an output. The servo loop circuit 506 also includes a fifth MOSFET 512, which acts as a current source (in FIG. 5) or sink (in FIG. 7). The fifth MOSFET 512 includes a gate (not numbered) electrically connected to the output of the amplifier 508 and a drain (not numbered) electrically connected to the input 502 of the voltage buffer 310. The role of the servo loop circuit is to maintain the DC level at the output 504 of the voltage buffer 310 essentially equal to the reference voltage 510 regardless of the dark current of photodetector 314 and any offsets due to random device mismatch in the receiver circuit 306 or the voltage buffer 310. The servo loop should not interfere with the voltage pulse V$_{out}$ at the receiver circuit output 318 or the voltage pulse V$_{out\_buf}$ at voltage buffer output 504. The bandwidth of the servo loop should therefore be substantially lower than the frequency content of the voltage pulse $V_{out}$ at the receiver circuit output 318.

Figure 8:
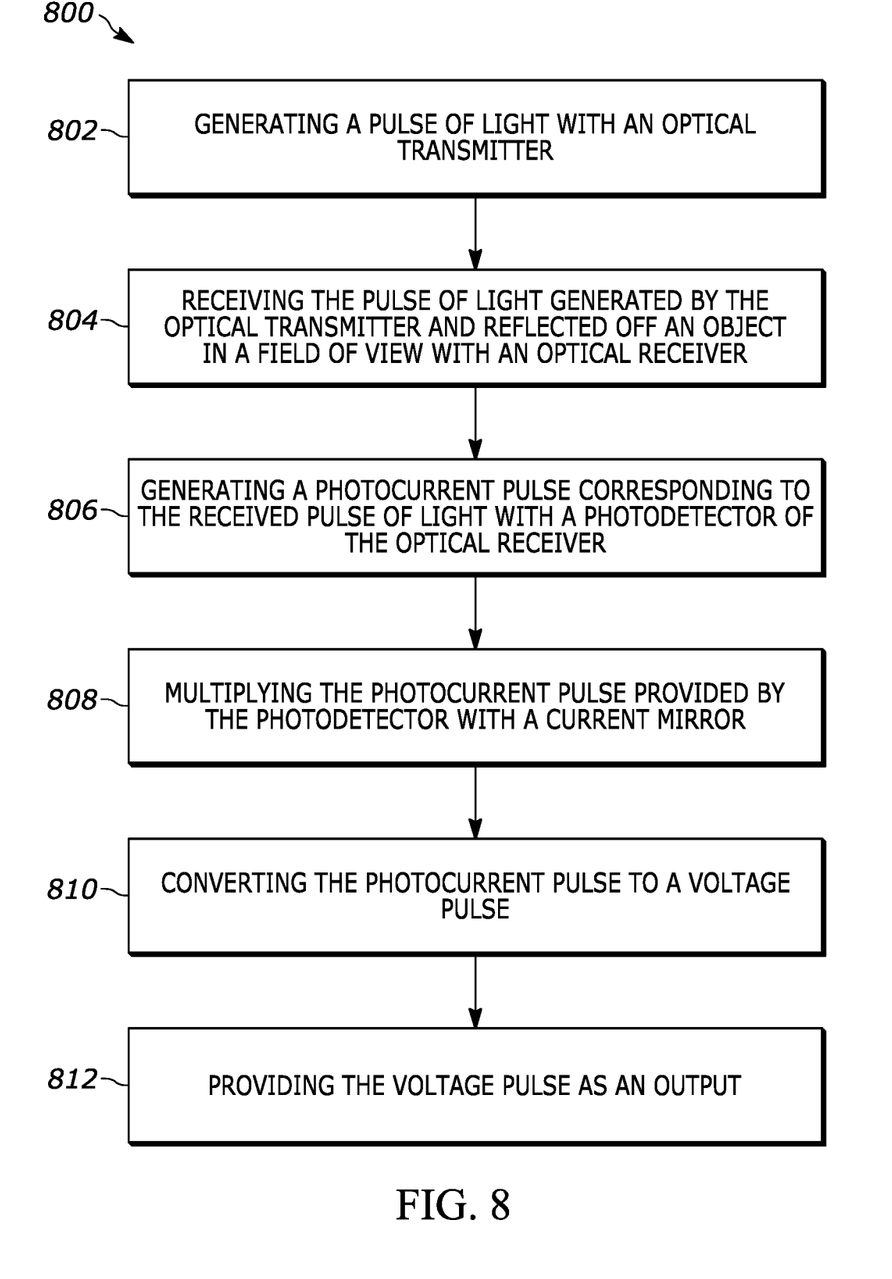
FIG. 8 is a flowchart of a method of operating a lidar sensor according to one exemplary embodiment.

A method 800 of operating a lidar sensor is shown in FIG. 8. The method 800 may be achieved utilizing the lidar system 100 described above and/or with other appropriate components.

The method 800 includes, at 802, generating a pulse of light with an optical transmitter, and at 804, receiving the pulse of light generated by the optical transmitter and reflected off an object in a field of view with an optical receiver. The method 800 also includes, at 806, generating a photocurrent pulse corresponding to the received pulse of light with a photodetector of the optical receiver.

The method 800 continues with, at 808, multiplying the photocurrent pulse provided by the photodetector with a current mirror. The method 800 also includes, at 810, converting the photocurrent pulse to a voltage pulse. Converting the photocurrent pulse to a voltage pulse may include applying linear current-to-voltage conversion in response to the photocurrent pulse being less than a threshold value and applying nonlinear current-to-voltage conversion in response to the photocurrent pulse being greater than or equal to the threshold value. That is, in the event of a small photocurrent pulse, the linear current-to-voltage conversion is applied and in the event of a larger photocurrent pulse, the nonlinear current-to-voltage conversion is applied. The above technique assists in providing a high input dynamic range for the optical receiver. The method 800 further includes, at 812, providing the voltage pulse as an output.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A lidar sensor, comprising:
    an optical transmitter configured to generate a pulse of light;
    an optical receiver configured to receive the pulse of light generated by said optical transmitter and reflected off an object in a field of view, said optical receiver including:
        a photodetector configured to generate a photocurrent pulse corresponding to the received pulse of light; and
        a receiver circuit electrically connected to said photodetector;
        said receiver circuit including a current mirror providing multiplication of the photocurrent pulse provided by said photodetector; and
        said receiver circuit configured to convert the photocurrent pulse to a voltage pulse and provide the voltage pulse as an output;
        a shunt MOSFET, which conducts a portion of said photocurrent pulse when said photocurrent pulse exceeds a threshold;
        wherein the shunt MOSFET has a source electrically connected to the receiver circuit output, a gate electrically connected to a bias voltage, and a drain electrically connected to a constant potential;
    a resistor electrically connected between the receiver circuit output and the constant potential and across the shunt MOSFET;
    a capacitance electrically connected between the receiver circuit output and the constant potential and across the shunt MOSFET;
    wherein a first value of the resistor is selected according to a desired amplitude and a desired decay time constant of the voltage pulse, and a second value of the capacitance is minimized.

2. The lidar sensor as set forth in claim 1, wherein said current mirror includes a first metal-oxide-semiconductor field-effect transistor ("MOSFET") and a second MOSFET, wherein each said MOSFET includes a gate electrically connected to said photodetector, said first MOSFET includes a drain electrically connected to said photodetector, and each said MOSFET includes a source electrically connected to a constant potential.

3. The lidar sensor as set forth in claim 2, wherein said optical receiver further includes a current source electrically connected to said drain of said first MOSFET.

4. The lidar sensor as set forth in claim 2, wherein said second MOSFET includes a drain electrically connected to said receiver circuit output.

5. The lidar sensor as set forth in claim 2, wherein said current mirror is further defined as a first current mirror and said receiver circuit further includes a second current mirror electrically connected to said first current mirror.

6. The lidar sensor as set forth in claim 5, wherein said second current mirror includes a third MOSFET and a fourth MOSFET, wherein each MOSFET includes a gate electrically connected to a drain of said second MOSFET, each MOSFET includes a source electrically connected to a constant potential, and a drain of said third MOSFET electrically connected to a drain of said second MOSFET.

7. The lidar sensor as set forth in claim 6, wherein said fourth MOSFET includes a drain electrically connected to said receiver circuit output.

8. The lidar sensor as set forth in claim 1, wherein said shunt MOSFET has a gate and a drain both electrically connected to said receiver circuit output and a source electrically connected to a constant potential.

9. The lidar sensor as set forth in claim 1, further comprising a PN junction having a P-type terminal electrically connected to said photodetector and an N-type terminal electrically connected to a constant potential, wherein said PN junction conducts a portion of said photocurrent pulse when said photocurrent pulse exceeds a threshold.

10. The lidar sensor as set forth in claim 1, further comprising a voltage buffer having an input and an output with said input electrically connected to said output of said receiver circuit.

11. The lidar sensor as set forth in claim 10, further comprising a servo loop circuit electrically connected to said output of said receiver circuit and said output of said voltage buffer.

12. The lidar sensor as set forth in claim 11, wherein said servo loop circuit includes an amplifier having a first input electrically connected to said output of said voltage buffer, a second input electrically connected to a reference voltage, and an output electrically connected to a gate of a fifth MOSFET, wherein a drain of said fifth MOSFET is electrically connected to an input of said voltage buffer.

13. A method of operating a lidar sensor, comprising:
    generating a pulse of light with an optical transmitter;

receiving the pulse of light generated by the optical transmitter and reflected off an object in a field of view with an optical receiver;

generating a photocurrent pulse corresponding to the received pulse of light with a photodetector of the optical receiver;

multiplying the photocurrent pulse provided by the photodetector with a current mirror;

converting the photocurrent pulse to a voltage pulse; and providing the voltage pulse as an output;

wherein the converting and providing comprises conducting a portion of the photocurrent pulse with a shunt MOSFET when said photocurrent pulse exceeds a threshold, wherein the shunt MOSFET has source electrically connected to a receiver circuit output, a gate electrically connected to a bias voltage, and a drain electrically connected to a constant potential, wherein a resistor is electrically connected between the receiver circuit output and the constant potential and across the shunt MOSFET and a capacitance is electrically connected between the receiver circuit output and the constant potential and across the shunt MOSFET, wherein a first value of the resistor is selected according to a desired amplitude and a desired decay time constant of the voltage pulse, and a second value of the capacitance is minimized.

14. The method as set forth in claim 13 wherein said step of converting the photocurrent pulse to a voltage pulse comprises applying linear current-to-voltage conversion in response to the photocurrent pulse being less than a threshold value and applying nonlinear current-to-voltage conversion in response to the photocurrent pulse being greater than or equal to the threshold value.

* * * * *